United States Patent [19]

Ruckenstein et al.

[11] Patent Number: 5,969,031

[45] Date of Patent: Oct. 19, 1999

[54] METHODS FOR PREPARING POLYMER BLENDS

[75] Inventors: Eli Ruckenstein, Amherst, N.Y.; Hangquan Li, Beijing, China

[73] Assignee: The Research Foundation of State University of New York, Amherst, N.Y.

[21] Appl. No.: 08/927,302

[22] Filed: Sep. 11, 1997

Related U.S. Application Data

[60] Provisional application No. 60/025,292, Sep. 20, 1996.

[51] Int. Cl.[6] .................................................. C08F 2/16
[52] U.S. Cl. ......................... 524/458; 524/461; 524/501
[58] Field of Search ................................. 524/458, 461, 524/501

[56] References Cited

U.S. PATENT DOCUMENTS

| | | | |
|---|---|---|---|
| 4,417,025 | 11/1983 | Toba et al. | 525/54.21 |
| 5,061,772 | 10/1991 | Yu | 526/320 |
| 5,087,603 | 2/1992 | Izubayashi et al. | 503/226 |
| 5,120,790 | 6/1992 | Yu | 525/186 |
| 5,284,900 | 2/1994 | Izubayashi et al. | 524/492 |
| 5,360,860 | 11/1994 | Itoh et al. | 524/460 |

OTHER PUBLICATIONS

Ruckenstein et al., "Hydrophilic–Hydrophobic Polymer Composites," *Journal of Polymer Science: Part C: Polymer Letters*, 26:529–536 (1988).
Ruckenstein et al., "Polymerization in Gel–Like Emulsions," *Journal of Applied Science*, 36:907–923 (1988).
Ruckenstein et al., "Concentrated Emulsions Pathways to Polymer Blending," *Polymer*, 31:2397–2402 (1990).
Ruckenstein et al., "The Tensile Behaviour and Toughness of Poly(Vinylidene Chloride)/Poly(butyl methacrylate) Composites Prepared by the Concentrated Emulsion Approach," *Polymer*, 35:4343–4348 (1994).
Li et al., "AB Crosslinked Polymer Latexes Via Concentrated Emulsion Polymerization," *Polymer*, 36:2281–2287 (1995).
Ruckenstein et al., "Self–Compatibilization of Polymer Blends Via Concentrated Emulsions," *Polymer Bulletin*, 35:517–524 (1995).
Li et al., "Self–Compatibilization of Poly(butyl methacrylate)/Acrylonitrile–co–styrene Blends via Concentrated Emulsion Polymerization," Polymerization, *J. Appl. Polym. Sci.*, 61:2285–2296 (1996).

*Primary Examiner*—Mark L. Warzel
*Attorney, Agent, or Firm*—Nixon, Hargrave, Devans & Doyle LLP

[57] ABSTRACT

The present invention relates to a method for preparing polymer composites. The method includes providing a mixture of concentrated emulsions and polymerizing the mixture of concentrated emulsions under conditions effective to form a polymer composite. The mixture of concentrated emulsions includes either a divinyl-terminated macromonomer and a first partially polymerized concentrated emulsion of a first monomer or a first partially copolymerized concentrated emulsion of a divinyl-terminated macromonomer and a first monomer. The mixture of concentrated emulsions further includes either a second partially polymerized concentrated emulsion of a second monomer or a second partially copolymerized concentrated emulsion of a divinyl-terminated macromonomer and a second monomer. Using the methods of the present invention, polymer blends and/or polymer networks containing compatibilizers can be produced. Since the polymers which are blended and the compatibilizers are generated simultaneously in situ, the methods of the present invention, compared to conventional melt-mixing techniques, are simpler and more flexible and produce compatibilized blends having improved mechanical and optical properties.

23 Claims, No Drawings

METHODS FOR PREPARING POLYMER BLENDS

The present application claims the benefit of U.S. Provisional patent application Ser. No. 60/025,292, filed Sep. 20, 1996.

The invention was made with support from the National Science Foundation (Grant No. CTS-9301-711). The Federal Government may retain certain rights in the invention.

FIELD OF INVENTION

The present invention relates, generally, to methods for preparing polymer composites and, more particularly, to methods for preparing polymer blends.

BACKGROUND OF THE INVENTION

New polymeric materials can be developed by combining monomers, polymers, or both monomers and polymers with different chemical structures by copolymerization, grafting, or blending. For a random copolymer, the mechanical properties are usually near or below the weight average of the individual homopolymers. In contrast, for a polymer blend, each constituent may retain some of the features of its own structure, but, most importantly, a synergism in mechanical properties can be achieved (Utracki, *Inter. Polym. Proc.*, 2:3 (1987) and Keskkula et al., "Toughening Agents for Engineering Polymers", in Collyer, ed., *Rubber Toughened Engineering Plastics*, New York:Chapman & Hall, p.136 (1994)). For instance, a stiff component can be toughened by blending it with flexible components (Xanthos et al., *Polym. Eng. Sci.*, 31:929 (1991) and Xanthos, *Polym. Eng. Sci.*, 28:1392 (1988)). However, in the preparation of a blend from incompatible polymers, the problem of incompatibility frequently arises, and, as a result, the mechanical properties of the blend often catastrophically fall below those of the homopolymers. A large number of attempts have been made to improve the compatibility of blends, either by generating specific interactions or chemical reactions between different components or by the addition of a compatibilizer (Barlow et al., *Polym. Eng. Sci.*, 24:525 (1984); Xi et al., *Polym. Eng. Sci.*, 27:391 (1987); and Fayt et al., *Polym. Eng. Sci.*, 27:328(1987)). The preparation and compatibilization of polymer blends generally involve melt-mixing, usually in an extruder Tzoganakis *Adv. Polym. Technol.*, 9:321 (1989)). However, if special functional groups are absent in the components, no specific interactions or chemical reactions can occur, and, consequently, compatabilization cannot be achieved. In addition, the preparation of compatibilizers, usually di-block copolymers, is, in general, sophisticated and expensive.

For these reasons, an alternative approach to the formation and compatibilization of blends of immiscible polymers is needed. The present invention is directed to meeting this need.

SUMMARY OF THE INVENTION

The present invention relates to a method for preparing polymer composites. The method includes providing a mixture of concentrated emulsions and polymerizing the mixture of concentrated emulsions under conditions effective to form a polymer composite. The mixture of concentrated emulsions includes either a divinyl-terminated macromonomer and a first partially polymerized concentrated emulsion of a first monomer or a first partially copolymerized concentrated emulsion of a divinyl-terminated macromonomer and a first monomer. The mixture of concentrated emulsions further includes either a second partially polymerized concentrated emulsion of a second monomer or a second partially copolymerized concentrated emulsion of a divinyl-terminated macromonomer and a second monomer.

Using the methods of the present invention, polymer blends and/or polymer networks which contain compatibilizers are produced. Since the polymers which are blended and the compatibilizers are generated simultaneously in situ, compared to melt-mixing, the method of the present invention is simpler and more flexible. Moreover, since the mixing of the concentrated emulsions and the subsequent polymerization can be carried out in any container, the method does not require any special equipment, and the mixing time can be as long as required. As a result, compatibilized blends having improved mechanical and optical properties can be readily produced.

DETAILED DESCRIPTION OF THE INVENTION

The present invention relates to a method for preparing polymer composites. The method includes providing a mixture of concentrated emulsions and polymerizing the mixture of concentrated emulsions under conditions effective to form a polymer composite.

The mixture of concentrated emulsions includes either a divinyl-terminated macromonomer and a first partially polymerized concentrated emulsion of a first monomer or a first partially copolymerized concentrated emulsion of a divinyl-terminated macromonomer and a first monomer. The mixture of concentrated emulsions further includes either a second partially polymerized concentrated emulsion of a second monomer or a second partially copolymerized concentrated emulsion of a divinyl-terminated macromonomer and a second monomer.

A wide variety of divinyl-terminated macromonomers can be used in the practice of the present invention, such as divinyl-terminated poly(butadiene), and divinyl-terminated poly(caprolactone). Generally, the macromonomers have molecular weights ranging from about 500 to about 5000 g/mole, preferably from about 1000 to about 3000 g/mole, although the present invention can be practiced with macromonomers having molecular weights outside of these ranges. Other di-reactive-group-terminated macromonomers can be used in conjunction with or instead of the divinyl-terminated macromonomer.

The divinyl terminated macromonomers used in the practice of the present invention can, in some instances, be purchased from commercial sources. Alternatively, they can be prepared from suitable monomers or macromonomers, typically from a macromonomer having hydroxyl groups at both termini. Thus, for example, divinyl-terminated poly (butadiene) can be prepared from poly(butadiene) diol, and divinyl-terminated poly(caprolactone) can be prepared from poly(caprolactone) diol. This process involves reacting the diol in a suitable solvent, such as an aromatic hydrocarbon (e.g. benzene, toluene, or xylene), with a reactive form of a vinyl-terminated organic compound, such as acryloyl chloride. The reaction can be advantageously carried out in the presence of a Lewis base, such as a trialkylamine (e.g. triethylamine). Preferably, the Lewis base and reactive form of vinyl-terminated organic compound are each present in a molar amount approximately equal to the number of moles of diol hydroxyl groups present. The reaction can be carried out at a temperature from about 0° C. to about 80° C., more preferably from about 20° C. to about 80° C., most preferably about room temperature, and in a sealed container or under an inert atmosphere. Where a vinyl-terminated acid chloride is used and where the Lewis base is a trialkylamine, the divinyl-terminated macromonomer product can be isolated as a solution in a suitable solvent (such as toluene) from the reaction mixture by filtering off the trialkylamine hydrochloride produced in the course of the reaction.

As used herein, a partially polymerized concentrated emulsion of a monomer can be polymerized to any extent from 0% to 100%, such as from about 5% to about 40% or from about 10% to about 30%, wherein the percents indicate the weight percent of monomer and macromonomer reacted during partial polymerization relative to those initially present. Preferably, the partially polymerized concentrated emulsion of a monomer is polymerized from 0% to about 10% and, more preferably, from 0% to about 2.5% Generally, the partially polymerized concentrated emulsion is polymerized until a suitable viscosity is reached. The nature of the partial polymerization product is not critical to the practice of the present invention, but it typically contains unreacted monomer, incompletely polymerized prepolymer, completely polymerized polymer, and combinations of these. Thus, in contrast to a fully polymerized polymerization product, which cannot undergo further polymerization (i.e., which has substantially all of its reactive groups reacted), the partial polymerization product has some unreacted reactive groups capable of undergoing further polymerization.

The first partial polymerization product of the first monomer is preferably different than the second partial polymerization product of the second monomer. The first and second partial polymerization products can each be the partial polymerization product of any monomer which can be polymerized by radical polymerization, such as, for example, methacrylic acid; alkyl (including unsubstituted and substituted) methacrylates, such a methyl methacrylate and butyl methacrylate; styrene; vinyl acetate; acrylonitrile; vinyl chloride; vinylidene chloride; or combinations of these monomers. Each of the first and second partial polymerization products can be a partial polymerization products of a single monomer (i.e. a homopolymer) or, alternatively, each can be the partial polymerization product of a mixture of monomers (e.g. a copolymer). For instance, the first partial polymerization product and the second partial polymerization product can, independently, be partially polymerized poly(styrene-co-methyl methacrylate), poly(vinyl acetate), poly(acrylonitrile-co-styrene), poly(butyl methacrylate, poly(vinyl chloride), polystyrene, poly(alkyl acrylate), poly (alkyl methacrylate), poly(vinylidine chloride), and the like.

The concentrated emulsions used in the practice of the present invention have the appearance of a paste and differ from conventional emulsions in that the volume fraction, φ, of the concentrated emulsion's dispersed phase is greater than about 0.74. This number represents the volume fraction of the most compact arrangement of spheres of the same size. At higher volume fractions, such as 0.8, 0.9, and 0.99, it is believed that the concentrated emulsions contain polyhedral cells separated by thin films of continuous phase. It is believed that, in appropriate circumstances, such as in cases where the monomers and partial polymerization products are water soluble, the present invention can also be practiced using reverse concentrated emulsions, and it is intended that "concentrated emulsion" include of reverse concentrated emulsions as well.

A central feature of the present invention is the presence of a divinyl-terminated macromonomer in the concentrated emulsion during the final polymerization step. The divinyl-terminated macromonomer can be present in the concentrated emulsion either in free form or as part of a copolymer with, for example, the first monomer.

Although compatabilization can be effected with any concentration of divinyl-terminated macromonomer, the amount of divinyl-terminated macromonomer present determines the nature of the resulting polymer composite. If the concentration of divinyl-terminated macromonomer is low relative to the concentration of first and second partial polymerization products, the resulting composite will contain some copolymer, a network compatibilizer, and a higher percentage of homopolymers. Higher concentrations of divinyl-terminated macromonomer result in higher degrees of crosslinking of the components making up the first and second partial polymerization products. The weight ratio of divinyl-terminated macromonomer to the other reaction components, taken together, is, preferably, from about 0.01 to about 0.30 and, more preferably, from about 0.05 to about 0.10. In cases where the divinyl-terminated macromonomer is present in the form of a copolymer with the first and/or second monomer, weight ratio means the weight ratio of the constitutive macromonomer component to the other reaction components in the first and second partially polymerized and/or copolymerized concentrated emulsions. This weight ratio can be determined from the weights of the monomers and macromonomers from which these polymers and/or copolymers are made.

The mixture of concentrated emulsions used in the practice of the present invention can be prepared in a variety of different ways.

For example, the mixture of concentrated emulsions can be prepared by mixing two separate partially polymerized concentrated emulsions, at least one of which contains the divinyl-terminated macromonomer. Preferably, each of the two partially polymerized concentrated emulsions has a viscosity sufficiently great to prevent movement of the first and second monomers out of the cells of the emulsions in which they are contained. Mixing can be carried out by any convenient method, such as by transferring one concentrated emulsion into a vessel containing the other or, alternatively, by simultaneously transferring each concentrated emulsion to a third, initially empty vessel. During the mixing process, the combined emulsions are preferably agitated so that the two emulsions become thoroughly and rapidly dispersed within each other and so that macroscopically, they appear as a single emulsion. Agitation can be carried out using any suitable device, such as paddle mixers, magnetic stirrers, or kneaders, or by rotating the vessel in which the mixing takes place.

The concentrated emulsion containing the divinyl-terminated macromonomer can be prepared, for example, by first preparing a mixture of divinyl-terminated macromonomer and a first monomer, then emulsifying the mixture under conditions effective to form a concentrated emulsion, and then partially polymerizing the concentrated emulsion.

The mixture of divinyl-terminated macromonomer and first monomer can be made by simply mixing the first monomer with the divinyl-terminated macromonomer by conventional mixing techniques, such as stirring, rocking, kneading, and the like. In some cases, especially where the first monomer and/or the divinyl-terminated macromonomer are not liquids, the mixing can be effected by dissolving either or both in a suitable solvent, preferably a solvent immiscible with water, such as an aromatic hydrocarbon (e.g., benzene, toluene, xylene, and the like). The mixture can then be emulsified by adding it, preferably dropwise, to an aqueous solution of a suitable emulsifying agent, such as a sodium alkyl sulfate (e.g., sodium dodecyl sulfate ("SDS") and sodium lauryl sulfate), a dialkyl naphthalene sulfonate, or other surfactant which forms stable emulsions. The concentration of the emulsifying agent in the aqueous solution depends, in part, on the identity of the emulsifying agent and the desired volume fraction of the continuous aqueous phase. Where SDS is used as the emulsifying agent, generally, an SDS concentration of from about 1% to about 30%, preferably from about 5% to about 20%, and most preferably about 10% by weight is suitable. The addition is preferably carried out with vigorous stirring, such as with a stirrer or with a paddle mixer, and is continued until the volume fraction of the continuous aqueous phase reaches the desired volume fraction. For example, where the desired volume fraction of the concentrated emulsion's dispersed phase is 0.8, addition is continued until the volume of the emulsion in the reaction vessel is five times the volume of the aqueous solution initially present. The addition is preferably carried out over a prolonged period of time preferably from about 10 minutes to about 1 hour, more preferably about 15 minutes. Subsequent to the addition process, it is frequently advantageous, to stir or otherwise agitate the emulsion, thus formed, for an additional period of time, such as from about 10 minutes to about 1 hour, preferably for about 15 minutes. The addition and the subsequent stirring is preferably carried out in an inert atmosphere or under a flow of an inert gas, such as nitrogen or argon.

The partial polymerization of the concentrated emulsion containing a first monomer and a divinyl-terminated macromonomer described in the preceding paragraph, can be carried out by standard polymerization methods. Generally, the concentrated emulsion is mixed with a suitable polymerization initiator, and the concentrated emulsion is exposed to conditions sufficient to initiate polymerization of the monomer. The concentrated emulsion is then maintained under conditions sufficient to sustain polymerization of the monomer for a period of time sufficient to achieve the degree of partial polymerization desired. Typically, the degree of partial polymerization which has occurred is monitored by measuring the viscosity of the concentrated emulsion at various intervals, and the polymerization reaction is stopped, such as by cooling the reaction mixture or otherwise removing the conditions necessary to sustain polymerization, when the desired viscosity is reached. Suitable initiators for the monomers are well known in the art. For example, the initiator can be a peroxy radical initiator, such as ammonium persulfate; a photopolymerization initiator, such as benzophenone, 4-(2-hydroxyethoxy)phenyl 2-hydroxy-2-propyl ketone, azoisopropane, and 2,2-dimethoxy-2-phenylacetophenone; or thermal initiators, such as organic peroxides (e.g., dibenzoyl peroxide, t-butylhydroperoxide, cumylperoxide, or t-butylperbenzoate) or azo compounds (e.g., azobisisobutyronitrile ("AIBN") or 4,4'-azobis(4-cyanovaleric acid)). The polymerization reaction can be carried out without the use of solvent (i.e., neat), or, alternatively, it can be carried out by dissolving the monomer and the polymerization initiator in a suitable solvent, preferably a solvent which is immiscible with water. Where a solvent is used, the concentration of the monomer present in the reactant solution is typically from about 2% to about 20%, preferably from about 5% to about 10% by weight, based upon the weight of the total solution. The amount of initiator used is not critical to the practice of the present invention, but is preferably in an amount between about 0.1% and about 10% by weight, based upon the weight of the monomer. The polymerization is effected by exposing the monomer and initiator to light, preferably ultraviolet light, thermal sources, or ionizing radiation. The conditions necessary to initiate and sustain polymerization will depend upon the nature of the monomer and the nature of the initiator used, and will be readily apparent to those skilled in the art.

Alternatively, the concentrated emulsion containing the divinyl-terminated macromonomer can be prepared by first providing a concentrated emulsion of the partial polymerization product of the monomer and then mixing the concentrated emulsion of the partial polymerization product of the monomer with the divinyl-terminated macromonomer. The mixing can be carried out by adding, preferably with agitation, a solution of the divinyl-terminated macromonomer to the concentrated emulsion. Preferably, the solvent in which the divinyl-terminated macromonomer is dissolved is the same as the dispersed phase of the concentrated emulsion to which the divinyl-terminated macromonomer is to be added. Alternatively, the solvent used can be one which is miscible with the dispersed phase solvent and which will not break the emulsion. The divinyl-terminated macromonomer can, alternatively, be provided in the form of a concentrated emulsion, made, for example, by the methods described above using a dispersed phase solvent which is the same as the dispersed phase solvent used to prepare the concentrated emulsion of the partial polymerization product. Irrespective of whether the divinyl-terminated macromonomer is provided in the form of a concentrated emulsion or in the form of a solution, subsequent to adding the divinyl-terminated macromonomer to the concentrated emulsion of the partial polymerization product of the monomer, the resulting mixture can be further agitated for a period of time, preferably from about 10 minutes to about 1 hour, more preferably about 15 minutes, and preferably at about room temperature. Optimally, these mixing processes are carried out under conditions which do not initiate or sustain polymerization of the monomer or macromonomer.

The partially polymerized concentrated emulsion of the first monomer described in the preceding paragraph can be prepared by providing a concentrated emulsion of the monomer, preferably containing a suitable initiator, and effecting partial polymerization of the monomer by exposing the concentrated emulsion to conditions suitable for initiating and sustaining polymerization of the monomer. In the case where the initiator is a thermal initiator, such as AIBN, the polymerization can be carried out by introducing the concentrated emulsion into a water bath at about 40° C. to about 100° C., preferably from about 45° C. to about 60° C., most preferably about 50° C., for a period of time sufficient to produce the desired degree of partial polymerization. For example, a 20% conversion can be achieved in from about 1 hour to about 5 hours at about 50° C.

Alternatively, the partially polymerized concentrated emulsion of the first monomer can be prepared by first providing a partial polymerization product of the first monomer and then emulsifying this partial polymerization product of the first monomer under conditions effective to form a concentrated emulsion, such as those described above.

As indicated above, the polymer composite of the present invention can also be prepared by polymerizing a mixture of concentrated emulsions which contains a first partially copolymerized concentrated emulsion of a divinyl-terminated macromonomer and a first monomer and either a second partially polymerized concentrated emulsion of a second monomer or a second partially copolymerized concentrated emulsion of a divinyl-terminated macromonomer and a second monomer. The mixture of concentrated emulsions which is polymerized to form the polymer composite of the present invention can be prepared by providing a first concentrated emulsion which includes the partial copolymerization product of the divinyl-terminated macromonomer and the first monomer and mixing the first concentrated emulsion with a second concentrated emulsion. The second concentrated emulsion can include either the second partial polymerization product of the second monomer or the second partial copolymerization product of the divinyl-terminated macromonomer and the second monomer. In the case where the second concentrated emulsion includes the second partial polymerization product of the second monomer, it is frequently advantageous further to include an amount of divinyl-terminated macromonomer in the second concentrated emulsion.

The first concentrated emulsion can be prepared, for example, by reacting a mixture of a monomer and divinyl-terminated macromonomer to partially copolymerize the first monomer and the divinyl-terminated macromonomer and emulsifying the resulting copolymerization product under conditions effective to form a concentrated emulsion. Partial copolymerization can be carried out using the initiators and conditions described above with respect to polymerization of monomers, except, of course, that the divinyl-terminated macromonomer is present in the reaction mixture. Although not critical to the practice of the present invention, it is preferred that the weight ratio of macromonomer to all other reaction components (i.e., all other monomers) be from about 0.01 to about 0.3, more preferably from about 0.05 to about 0.1. The degree of is partial polymerization is monitored by any convenient method, such as by measuring the viscosity of the resulting solution.

In some instances, it may be advantageous to partially polymerize the monomer prior to the addition of the divinyl-terminated macromonomer, so that the first partial copolymerization product of the divinyl-terminated macromonomer and the first monomer is provided by reacting a mixture of a first partially polymerized monomer and a divinyl-terminated macromonomer under conditions effective to partially copolymerize the first partially polymerized monomer and the divinyl-terminated macromonomer. For example, the first monomer containing AIBN can be partially polymerized at 50° C. for one hour to increase moderately its viscosity. Optimally, the viscosity of the partially polymerized monomer is sufficiently high to enhance the stability of the concentrated emulsion which is subsequently formed therefrom during heating at high temperatures, but sufficiently low so that the generation of the concentrated emulsion is not impeded. The partially polymerized monomer can then be mixed with the macromonomer, and the reaction mixture polymerized by increasing the temperature to about 50° C. for about three hours in order to copolymerize the macromonomer and the partially polymerized monomer. The degree of partial polymerization of the divinyl-terminated macromonomer and partially polymerized monomer can be monitored by the viscosity of the resulting solution. Subsequent to copolymerization, the resulting first partial copolymerization product of the divinyl-terminated macromonomer and the partially polymerized first monomer is then emulsified under conditions effective to form a concentrated emulsion.

The mixture of concentrated emulsions whose polymerization produces the polymer composite of the present invention can be provided, alternatively, by first preparing a partially polymerized concentrated emulsion comprising a first monomer and a second partially polymerized concentrated emulsion of a second monomer and mixing the mixture of these two concentrated emulsions with the divinyl-terminated macromonomer. The divinyl-terminated macromonomer can be provided in the form of a solution or in the form of a concentrated emulsion. The solvent used to form the solution or the dispersed phase of the macromonomer-containing concentrated emulsion is preferably miscible with the solvent used to form the dispersed phase of the concentrated emulsion containing the first and second partial polymerization products. It is further preferred that this solvent be one which does not break the concentrated emulsion of the first and second partial polymerization products. In most cases, the solvent chosen to dissolve the divinyl-terminated macromonomer or to disperse the divinyl-terminated macromonomer in a concentrated emulsion will be the same as the solvent used in the dispersed phase of the concentrated emulsion containing the first and second partial polymerization products.

The concentrated emulsion containing the first partial polymerization product and the second partial polymerization product can be prepared, for example, from two separate concentrated emulsions, each containing one of the partial polymerization products. The two concentrated emulsions are mixed together under conditions effective to form a single concentrated emulsion which includes the first partial polymerization product of the first monomer and the second partial polymerization product of the second monomer. The mixing can be effected by transferring one of the concentrated emulsions into a vessel containing the other concentrated emulsion or, alternatively, by simultaneously transferring each concentrated emulsion to a third, initially empty vessel. During the mixing process, the combined emulsions are preferably agitated so that the two emulsions become thoroughly and rapidly dispersed within each other and so that, macroscopically, they appear as a single emulsion. Agitation can be carried out using any suitable device, such as paddle mixers, magnetic stirrers, or kneaders, or by rotating the vessel in which the mixing takes place.

As one skilled in the art will recognize, the mixture of concentrated emulsions whose polymerization produces the polymer composite of the present invention can contain additional components. For example, the mixture of concentrated emulsions can contain additional (i.e., third, fourth, etc.) partially polymerized concentrated emulsions (each of which can, optionally, include a divinyl-terminated macromonomer), unpolymerized concentrated emulsions, or regular emulsions (e.g., partially polymerized or unpolymerized regular emulsions). Moreover, one skilled in the art will appreciate that each of the partially polymerized concentrated emulsions can be of a single monomer or of a mixture of two or more monomers.

Further details regarding the practice of the present invention can be found in Ruckenstein and Li, "Self-compatibilization of Polymer Blends Via Concentrated Emulsions," *Polymer Bulletin*, 35:517–524 (1995) and in Li and Ruckenstein, "Self-Compatibilization of Poly(butyl methacrylate)/Acrylonitrile-co-styrene Blends via Concentrated Emulsion Polymerization," *J. Appl. Polym. Sci.*, 61:2285–2296 (1996), which are hereby incorporated by reference.

The present invention is further illustrated by the following examples.

EXAMPLES

Example 1

Materials Employed in the Experiments.

Azobisisobutyronitrile ("AIBN", Kodak) was recrystallized from methanol. Other chemicals were purchased from Aldrich. Styrene ("St"), methyl methacrylate ("MMA"), vinyl acetate ("VAc"), butyl methacrylate ("BMA"), and acrylonitrile ("AN") were filtered through an inhibitor removal column before use. Polycaprolactone diol ("PCL diol", molecular weight=2,000), polybutadiene diol ("PB diol", molecular weight=2,800), triethylamine ("TEA", 99%), acryloyl chloride ("AC", 96%), sodium dodecyl sulfate ("SDS", 70%), toluene (99%), tetrahydrofuran ("THF", 99%), dimethyl formamide ("DMF", and all other compounds 99%) were used as received.

Example 2
Preparation of Vinyl-terminated PCL ("VTPCL") and Vinyl-terminated PB ("VTPB").

VTPCL and VTPB was prepared by the general method described in Li et al., "AB Crosslinked Polymer Latexes Via Concentrated Emulsion Polymerization," *Polymer* 36:2281–2287 (1995) ("Li"), which is hereby incorporated by reference.

A solution of PB or PCL diol in toluene (20 g per 100 ml) was introduced in a single-neck flask equipped with a magnetic stirring-bar. Triethylamine (one mole for each mole of OH groups of the dissolved diol) was added to the solution, and the flask was sealed with a rubber septum. Acryloyl chloride (one mole for each mole of OH groups) was introduced dropwise at room temperature with stirring with a syringe through the rubber septum. The OH group reacts with AC to form a vinyl group:

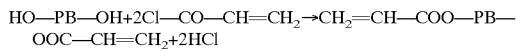
HO—PB—OH+2Cl—CO—CH=CH$_2$→CH$_2$=CH—COO—PB—OOC—CH=CH$_2$+2HCl

The HCl molecules produced in the above reaction reacted with TEA:

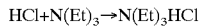
HCl+N(Et)$_3$→N(Et)$_3$HCl and the formed quaternary ammonium salt remained suspended in the system as a white powder. Removing the white powder by filtering produced a toluene solution of vinyl terminated PB or PCL, which was subsequently used at a concentration of 0.2 g/ml.

Example 3
Concentrated Emulsion Polymerization of Styrene/MMA and VAc.

A mixture was first prepared from a mixture of monomers or a monomer (styrene/MMA or VAc), azobisisobutyronitrile initiator (0.005 g/g of monomers), and a VTPCL solution. The mixture thus prepared was used as the dispersed phase of a concentrated emulsion. An aqueous solution of SDS (10 wt %) was first placed in a flask provided with a magnetic stirrer. The mixture was added dropwise with vigorous stirring into the flask with a syringe, until the volume fraction of the SDS aqueous solution became 0.2. The whole addition process lasted about 15 minutes and took place at room temperature. The paste-like concentrated emulsion thus formed was stirred for an additional 15 min under a flow of nitrogen. Two concentrated emulsions of different monomers were prepared and introduced into a water bath at 50° C. to carry out the partial polymerization of each until a 20% conversion was achieved (about 3 h). Subsequently, the two concentrated emulsions were mixed with magnetic stirring. The mixture of concentrated emulsions thus obtained was further heated at 60° C. for 48 h to complete the polymerization. The product thus obtained was washed three times with 2-propanol and dried in a vacuum oven for 24 h. The blend product of the concentrated emulsion polymerization was obtained as a white powder. This blend product is hereinafter denoted as concentrated emulsion blend ("CEB").

For comparison purposes, copolymers from styrene/MMA, SM, PVAc, and copolymers from styrene/MMA/VAc were also prepared via the concentrated emulsion polymerization process.

Example 4
Concentrated Emulsion Polymerization of BMA and Styrene/AN.

EMA or a mixture of AN and styrene containing an initiator (AIBN, 0.005 g/g monomers) was partially polymerized at 50° C. for 1 h in order to moderately increase the viscosity. A vinyl terminated macromonomer ("VTM") solution can be introduced into the monomers before or after their partial polymerization, or even later, after the mixing of the two concentrated emulsions. The two partially polymerized systems were subsequently used as the dispersed phases of two concentrated emulsions. In the preparation of a concentrated emulsion, an aqueous solution of SDS (10 wt %) was first placed in a flask provided with a magnetic stirrer. The flask was sealed with a rubber septum, after which the air inside was replaced with nitrogen. The partially polymerized monomer was added dropwise with vigorous stirring into the flask with a syringe, until the volume fraction of the SDS aqueous solution became 0.2. The whole addition process lasted about 15 minutes and was carried out at room temperature. The two concentrated emulsions thus prepared were introduced into a water bath at 50° C. to carry out another partial polymerization for a selected time span (about 1–4 hours). Subsequently, the two concentrated emulsions were mixed, and the mixture was further heated at 50° C. to complete the polymerization. In the kinetic study, the final polymerization lasted various lengths of time. The product was washed with methyl alcohol and dried in a vacuum oven for 24 h. The blend produced by the concentrated emulsion polymerization was obtained as a white powder.

Example 5
Preparation of Solution Blends and Copolymers.

Solution blends of AN-St/PBMA were obtained by casting solutions of AN-St and PBMA in dimethyl formamide on glass plates, and evaporating the solvent. A SM/PVAc solution blend was obtained by casting the solution of SM and PVAc in chloroform on a glass plate and evaporating the solvent.

Binary copolymers of AN-St and ternary copolymers of AN-St-BMA were prepared by bulk polymerization at 50° C. for 24 h.

Example 6
Tensile Testing and Solubility Measurements.

The powders of the concentrated emulsion blends or the bulk materials of the solution blends or copolymers were thermo-pressed with a Laboratory Press (Fred S. Carver INC.) at 150° C. for 3–5 min, and then cooled to room temperature. The sheets thus obtained were cut with a die to the size required by the ASTM D.638-58T. Tensile testing was conducted at room temperature with an Instron Universal Testing Instrument (Model 1000). The elongation speed of the instrument was 20 mm/min.

Solubility measurements of the BMA-St/AN concentrated emulsion blends were conducted sequentially. A pre-weighed blend sheet, prepared as for tensile testing, was immersed in toluene in a test tube at room temperature, using 10 ml of solvent for each gram of sheet. The solvent in the tube was replaced with fresh solvent every 8 h, until all the soluble species were removed (less than 48 h). The remaining sheet was dried in a vacuum oven for 24 h to remove the solvent. The ratio of the weight lost to that of the original sheet was denoted as toluene removed fraction (in wt %). The remaining sample was further immersed in THF at 50° C. and, finally, in DMF at 50° C. The ratio of the weight lost in the THF or DMF to that of the original sheet are denoted as THF or DMF removed fractions (in wt %), respectively. The weight ratio (in wt %) of the final remaining sample to the original sheet was considered as the network content (the crosslinked part of the blend).

The solubility of VAc-St/MMA concentrated emulsion blends were measured by the following procedure. A pre-weighed blend sheet, prepared as for tensile testing, was washed with methanol in an extractor for 12 h. The remaining sheet was retrieved and dried in a vacuum oven for 24 h to remove the solvent. The ratio of the weight lost during washing to that of the original sheet represents the content of methanol soluble species ("CMSS") and was taken as the content of VAc homopolymer (in wt %). The sheet remaining after methanol washing was further washed with chloroform for 12 h. The weight percentage of the remaining sheet to the original weight was considered as the gel content (the crosslinked part of the blend).

Example 7
Properties of SM/PVAc Solution Blends.

Data for the solution blends and pure SM (styrene/MMA wt ratio=1/1) and PVAc are listed in Table 1. The solution blends were milk opaque materials. Compared with the pure SM and PVAc, the mechanical properties of these blends were significantly decreased.

Both the appearance and the mechanical properties indicated a complete incompatibility. The solution blends represent an extreme case in which no copolymers are present. From the content of methanol soluble species, one can conclude that the method employed herein to evaluate the content of VAc homopolymer is suitable.

TABLE 1

| wt. Ratio of SM/PVAc | Tensile Strength (MPa) | | Elongation at Break (%) | | Content of Methanol Soluble Species (%) |
|---|---|---|---|---|---|
| | Average | Std. Error | Average | Std. Error | |
| 1/0 | 65.5 | 3.2 | 10.2 | 1.3 | 0 |
| 1/0.5 | 16.2 | 1.0 | 10.3 | 0.4 | 64.6 |
| 1/1 | 7.2 | 0.5 | 26.7 | 1.6 | 46.9 |
| 1/2 | 6.0 | 0.4 | 65.4 | 5.4 | 31.7 |
| 0/1 | 15.1 | 1.6 | 350 | 19.5 | 100 |

Example 8
Properties of St/VAc and MMA/VAc Copolymers.

The properties of the copolymers are listed in Table 2. Copolymerization between either styrene and VAc or MMA and VAc occurs with difficulty. For this reason, the copolymerization of VAc with either styrene or MMA does not lead to copolymers only, but to mixtures of homopolymers and copolymers. This is clearly shown by the content of PVAc in Table 2, which indicates that only about 50% of VAc monomer was combined with styrene or MMA as copolymers. (The copolymers do not dissolve in methanol.) Table 2 also shows that the conversions were relatively low. A large fraction of the monomers remained unreacted or formed only oligomers after 48 h of polymerization. However, because of the presence of the copolymer chains, the mechanical properties were generally better than those of the solution blends.

TABLE 2

| wt. Ratio of St/MMA/VAc | Tensile Strength (MPa) | | Elongation at Break (%) | | Con-version (%) | Content of Methanol Soluble Species (%) |
|---|---|---|---|---|---|---|
| | Average | Std. Error | Average | Std. Error | | |
| 1/1/1 | 21.1 | 2.4 | 13.2 | 0.8 | 84 | 15.6 |
| 1/1/2 | 12.5 | 0.6 | 29.8 | 2.8 | 83 | 24.5 |
| 1/1/4 | 8.8 | 0.6 | 61.4 | 5.9 | 81 | 34.0 |

Example 9
Properties of the St/MMA/VAc Concentrated Emulsion Blends without VTPCL.

The data for the concentrated emulsion blends ("CEBs") without VTPCL are presented in Table 3. The content of homo-PVAc in the CEBs were higher than those in solution blends. It is believed that this is a result of the preparation methodology. In the preparation of CEBs (described above), each concentrated emulsion was first partially polymerized until a 20% conversion was achieved, and, subsequently, the two were mixed. At that conversion, each concentrated emulsion acquired a high viscosity, which delayed the transfer of the monomers and oligomers from one latex to another, thus inhibiting copolymerization. Nevertheless, about 10% of the VAc monomer was involved in copolymerization. Table 3 also demonstrates that the conversions of the CEBs were higher than those of the copolymers. It is believed that this occurs because of the homopolymerization of VAc. The mechanical properties of the CEBs were comparable to those of the copolymers. Because of the higher CEB content in homo-PVAc, the tensile strengths were somewhat lower, but the elongations at break were somewhat higher. Both the copolymers and the CEBs were translucent, which indicates that the compatibility in both systems was somewhat improved.

TABLE 3

| wt. Ratio of St/MMA/VAc | Tensile Strength (MPa) | | Elongation at Break (%) | | Conversion (%) | Content of Methanol Soluble Species (%) | Content of Chloroform Insoluble Species (%) |
|---|---|---|---|---|---|---|---|
| | Average | Std. Err. | Average | Std. Err | | | |
| 1/1/1 | 20.5 | 0.5 | 14.1 | 2.5 | 92 | 27.3 | 0 |
| 1/1/2 | 11.4 | 0.8 | 32.7 | 1.7 | 91 | 41.7 | 0 |
| 1/1/4 | 8.5 | 0.7 | 62.2 | 3.8 | 89 | 57.6 | 0 |

Example 10
Properties of the St/MMA/VAc Concentrated Emulsion Blends With VTPCL.

To strengthen the compatibilizing effect, small amounts of VTPCL were introduced. The reactions between VTPCL and styrene and between MMA and VAc generate AB networks, with PCL as chains A and the copolymer and homopolymers of those monomers as chains B. It is believed that, because the network contains chains of both SM and PVAc, the network serves to compatilize the two. All the CEBs with VTPCL appeared transparent, which indicated improved compatibility. The effect of self-compatibilization is also made clear by Table 4. The tensile strength and elongation at break increase simultaneously, in contrast to what happens in Tables 2 and 3. Of course, the PCL chains themselves can improve, to some extent, the mechanical properties. Indeed, it was noted in Li, which is hereby incorporated by reference, that PCL can toughen PMMA when the weight ratio of PCL/PMMA is higher than 20/100. However, this kind of improvement differs from that caused by compatibilization. Comparison between different contents of VTPCL indicates that a content of 0.05 g/g of the other monomers is enough for self-compatibilization. A higher content of VTPCL results in a lower tensile strength and a higher elongation at break.

In the preparation of the samples of Table 4, VTPCL was equally distributed between the two concentrated emulsions. CEBs in which only one concentrated emulsion contained VTPCL were also prepared, and the results are presented in Table 5. Table 5 shows that if VTPCL is introduced only in VAc, comparable mechanical properties are obtained as when VTPCL is introduced in both concentrated emulsions. When, however, VTPCL is added to styrene/MMA only, lower mechanical properties are achieved. This can be ascribed to the decrease in compatibility. Indeed, better compatibilization is achieved when both SM and homo-PVAc chains are present in the network. Because of the copolymerization parameters, styrene and MMA were more easily included in the network than VAc after the concentrated emulsion containing styrene, MMA, and VTPCL was mixed with that containing VAc alone. The homo-PVAc has the opportunity to combine with VTPCL only when VTPCL is present in the VAc containing concentrated emulsion.

TABLE 4

| wt. Ratio of St/MMA/ VAc | Tensile Strength (MPa) | | Elongation at Break (%) | | Conversion (%) | Content of Methanol Soluble Species (%) | Content of Chloroform Insoluble Species (%) |
|---|---|---|---|---|---|---|---|
| | Average | Std. Err. | Average | Std. Err | | | |
| VTPCL = 0.05 g/g of other monomers | | | | | | | |
| 1/1/1 | 46.6 | 5.8 | 20.7 | 4.1 | 93 | 19.6 | 18.2 |
| 1/1/2 | 42.7 | 3.7 | 43.0 | 1.6 | 94 | 30.3 | 17.1 |
| 1/1/4 | 35.1 | 2.6 | 61.4 | 5.4 | 91 | 42.7 | 15.2 |
| VTPCL = 0.1 g/g of other monomers | | | | | | | |
| 1/1/1 | 36.8 | 3.3 | 23.6 | 3.1 | 94 | 18.0 | 32.7 |
| 1/1/2 | 30.4 | 1.6 | S0.9 | 5.4 | 92 | 28.8 | 30.6 |
| 1/1/4 | 26.5 | 3.6 | 67.5 | 3.3 | 91 | 33.4 | 29.3 |

TABLE 5

| VTPCL containing conc. emul. | Tensile Strength | | Elongation at Break (%) | | Conversion (%) | Content of Methanol Soluble Species (%) | Content of Chloroform Insoluble Species (%) |
|---|---|---|---|---|---|---|---|
| | Average | Std. Err. | Average | Std. Err | | | |
| St/MMA | 23.3 | 0.5 | 32.1 | 2.5 | 92 | 32.4 | 16.6 |
| VAc | 40.7 | 1.9 | 42.2 | 3.9 | 94 | 29.6 | 16.2 |
| both | 42.4 | 3.7 | 43.0 | 1.6 | 94 | 30.3 | 15.0 |

St/MMA/VAc wt ratio = 1/12
VTPCL = 0.1 g/g of other monomers

Example 11
Effect of the VTPCL Distribution in the St/MMA/VAc Concentrated Emulsion Blends.

Example 12
Effect of the Styrene/MMA Ratio in the St/MMA/VAc Concentrated Emulsion Blends.

Table 6 shows the effect of the styrene/MMA wt ratio on the mechanical properties. Elongation at break decreased with increasing styrene/MMA ratio, while tensile strength exhibited a maximum. This behavior can be explained on the basis of the difference in the polarities of the components, which are reflected in the solubility parameters. The solubility parameters of PS, PMMA, and PVAc are 17.5–18.5, 18.5–19.5, and 19–21 $(MPa)^{1/2}$, respectively. The polarity of PVAc is closer to that of PMMA than to that of PS. In other words, the compatibility between PVAc and PMMA is higher than that between PVAc and PS. For this reason, PVAc had a stronger effect on the blends with higher MMA content. Therefore, the higher the MMA content, the higher the elongation at break and the lower the tensile strength. For samples free of MMA, compatibility was very low, and both the elongation at break and the tensile strength were poor.

obtained. Phase separation could be detected even with the unaided eye. The toughnesses of the blends, expressed as the areas under the stress-strain curves, were extremely low, in the range of 3–5 $MJ/m^3$; the elongations at break were below 10%. The poor mechanical properties of such blends, without compatibilization, make them unsuitable for many applications.

Example 14
Properties of AN/St/BMA Copolymers.

The mechanical properties and solubilities of the AN/St/BMA copolymers are presented in Table 7, which, for comparison purposes, also contains the properties of BMA homopolymers. Table 7 shows that the mechanical properties of the ternary copolymers were essentially the weight averages of those of AN-St and PBMA. Since the different units are randomly distributed, no toughening of AN-St by

TABLE 6

| wt. Ratio of | Tensile Strength (MPa) | | Elongation at Break (%) | | Content of Conversion (%) | Content of Chloroform Methanol Soluble Species (%) | Content of Insoluble Species (%) |
|---|---|---|---|---|---|---|---|
| St/MMA | Average | Std. Err. | Average | Std. Err | | | |
| 100/0 | 24.5 | 0.6 | 28.9 | 3.6 | 81 | 22.1 | 33.3 |
| 25/75 | 38.2 | 0.8 | 43.3 | 2.7 | 85 | 24.9 | 30.4 |
| 50/50 | 30.4 | 1.6 | 50.9 | 5.4 | 92 | 28.3 | 29.4 |
| 75/25 | 24.5 | 0.8 | 67.6 | 4.1 | 95 | 27.6 | 32.2 |
| 0/100 | 19.5 | 0.7 | 100.5 | 6.8 | 97 | 28.4 | 31.7 |

VTPCL = 0.1 g/g of other monomers

Example 13
Properties of AN-St/PBMA Solution Blends

A series of AN-St/PBMA blends was prepared via solution blending. For the AN-St copolymers the weight ratios of AN and St were 0/100, 25/75, 50/50 and 75/25, respectively. The weight ratio of AN-St/PBMA was 1/1. The incompatibility of these blends can be predicted from the chemical structures as well as the solubility parameters of the two polymers. The solubility parameters of polyacrylonitrile ("PAN"), polystyrene ("PS"), and PBMA are 31.5, 17.8, and 14.7 $(MPa)^{1/2}$, respectively. The difference between the values of these parameters for PS and PBMA is large enough for them to be incompatible, and the difference for PBMA and AN-St is even larger. Regarding the chemical structures, the flexible butoxy groups are quite different from the bulky phenyl groups of PS or from the strong polar CN groups of PAN. Indeed, the incompatibility of AN-St/PBMA solution blends was revealed by the non-uniformity of the materials PBMA can be achieved. Even when the BMA fraction was higher than 50 wt %, the toughness was still very low. The solubility measurements of the copolymers in the three solvents (toluene, THF and DMF) were carried out separately and not sequentially as they were for the concentrated emulsion blends. The solubilities in various solvents can be roughly evaluated on the basis of the content of AN, which determines the polarity of the copolymer. Toluene dissolved copolymers with an AN content below 10 wt % and partially dissolved those with an AN content between 10 and 25 wt %. THF dissolved the copolymers with an AN content up to 25 wt % and partially dissolved those with an AN content between 25 and 33 wt %. All the copolymers dissolved completely in DMF. The above results suggest that the solubility measurement procedure, presented in Example 6, can be used to obtain qualitative information about the composition of the concentrated emulsion blends.

TABLE 7

| Composition | | Solubility | | Mechanical properties | | | |
|---|---|---|---|---|---|---|---|
| | | toluene | THF | Yield | Elongation | Young | |
| wt. ratio AN/St/BMA | wt % of AN | soluble wt. % | soluble wt. % | strength (MPa) | at break (%) | Modulus (MPa) | Toughness $MJ/m^3$ |
| 75/25/0 | 75 | 0 | 0 | too brittle to be measured | | | |
| 50/50/0 | 50 | 0 | 0 | 84.1 | 8 | 1800 | 6.3 |
| 33/33/33 | 33 | 0 | 50 | 62.5 | 16 | 1230 | 7.3 |
| 25/75/0 | 25 | 18 | 100 | 81.0 | 7 | 1505 | 4.9 |
| 25/25/50 | 25 | 20 | 100 | 52.0 | 8 | 1060 | 4.7 |
| 17/17/66 | 17 | 26 | 100 | 41.7 | 23 | 910 | 5.5 |
| 10/10/80 | 10 | 100 | 100 | 32.8 | 73 | 480 | 20.4 |
| 0/0/100 | 0 | 100 | 100 | 20.5 | 150 | 305 | 20.4 |

Example 15
Kinetic Studies of the Concentrated Emulsion Polymerization and Compatibilization Processes Tables 8–13 show the solubilities and mechanical properties of various emulsion blends at various times after mixing the concentrated partially-polymerized emulsions.

TABLE 8

| Time of polymn. after the concentrated emulsions were mixed (h) | Conversion (wt %) | Solubilities: wt % in product and (wt % of the initial reactants) | | | | Mechanical properties and (Std. Err.) | | | |
|---|---|---|---|---|---|---|---|---|---|
| | | toluene removed | THF removed | DMF removed | Network Content | Yield strength (MPa) | Elongation at break (%) | Young Modulus (MPa) | Toughness MJ/m³ |
| 0  | 9.2  | 55.3 (5.1)  | 35.0 (3.2)  | 0 | 9.7 (0.9)   | 17.3 (0.5) | 35 (1.0)  | 232 (5)   | 4.9 (0.3)  |
| 3  | 39.8 | 39.6 (15.7) | 25.3 (10.1) | 0 | 35.1 (14.0) | 28.3 (1.5) | 91 (4.9)  | 524 (38)  | 20.8 (1.7) |
| 6  | 71.1 | 42.6 (30.3) | 29.3 (20.9) | 0 | 28.1 (20.0) | 33.6 (1.9) | 114 (1.8) | 630 (14)  | 30.4 (2.7) |
| 12 | 89.2 | 43.9 (39.2) | 33.4 (29.8) | 0 | 22.6 (20.2) | 36.0 (2.8) | 83 (6.0)  | 676 (12)  | 25.1 (1.8) |
| 24 | 94.0 | 42.1 (39.6) | 36.2 (34.0) | 0 | 21.7 (20.4) | 38.1 (2.7) | 81 (3.1)  | 720 (28)  | 26.1 (2.7) |
| 48 | 98.0 | 40.9 (40.1) | 37.9 (37.2) | 0 | 21.1 (20.6) | 39.5 (1.9) | 75 (4.2)  | 724 (32)  | 25.9 (0.8) |

Wt. Ratio of AN/St = 25/75, wt ratio of (AN+ St)/BMA = −1/1, VTPCL = 5 wt % in monomer system
Time of partial polymerization of the monomer before the preparation of the concentrated emulsion: 1 h.
Time of partial polymerization of concentrated emulsions before mixing 30 min.

TABLE 9

| Time of polymn. after the concentrated emulsions were mixed (h) | Conversion (wt %) | Solubilities: wt % in product and (wt % of the initial reactants) | | | | Mechanical properties and (Std. Err.) | | | |
|---|---|---|---|---|---|---|---|---|---|
| | | toluene removed | THF removed | DMF removed | Network Content | Yield strength (MPa) | Elongation at break (%) | Young Modulus (MPa) | Toughness MJ/m³ |
| 0  | 8.5  | 50.5 (4.2)  | 0 (0)     | 35.8 (3.0)  | 12.9 (1.1)  | 19.9 (0.2) | 15 (0.7)  | 271 (10) | 2.4 (0.2)  |
| 3  | 29.8 | 24.3 (7.2)  | 5.7 (1.7) | 38.2 (11.4) | 31.8 (9.5)  | 25.7 (2.8) | 66 (2.6)  | 598 (27) | 13.8 (0.7) |
| 6  | 64.2 | 33.1 (21.3) | 4.6 (3.0) | 26.1 (11.8) | 36.1 (23.1) | 33.0 (1.1) | 154 (6.3) | 631 (21) | 42.7 (1.7) |
| 12 | 73.4 | 43.2 (31.7) | 5.2 (3.7) | 28.3 (20.8) | 31.9 (23.4) | 37.2 (0.8) | 125 (5.2) | 693 (12) | 38.6 (1.1) |
| 24 | 93.5 | 41.3 (38.6) | 5.2 (4.9) | 28.0 (26.2) | 25.5 (23.8) | 39.1 (1.4) | 118 (8.4) | 796 (12) | 38.7 (2.1) |
| 48 | 100  | 39.2 (39.2) | 5.5 (5.5) | 31.8 (31.8) | 24.2 (24.2) | 42.0 (1.3) | 115 (9.1) | 766 (3S) | 37.5 (0.8) |

Wt. Ratio of AN/St = 50/50, wt ratio of (AN + St)/BMA = −1/1, VTPCL = 5 wt % in monomer system
Time of partial polymerization of the monomer before the preparation of the concentrated emulsion: 1 h.
Time of partial polymerization of concentrated emulsions before mixing 30 min.

TABLE 10

| Time of polymn. after the concentrated emulsions were mixed (h) | Conversion (wt %) | Solubilities: wt % in product and (wt % of the initial reactants) | | | | Mechanical properties and (Std. Err.) | | | |
|---|---|---|---|---|---|---|---|---|---|
| | | toluene removed | THF removed | DMF removed | Network Content | Yield strength (MPa) | Elongation at break (%) | Young Modulus (MPa) | Toughness MJ/m³ |
| 0  | 7.8  | 56.5 (4.4)  | 0         | 28.2 (2.2)  | 8.4 (0.7)   | 20.6 (0.8) | 30 (1.5)  | 301 (10) | 4.9 (0.8)  |
| 3  | 30.0 | 45.7 (13.7) | 3.4 (1.0) | 20.4 (6.1)  | 30.5 (9.2)  | 33.1 (1.8) | 147 (1.0) | 624 (32) | 41.3 (1.8) |
| 6  | 53.9 | 37.1 (20.0) | 3.0 (1.6) | 21.3 (11.5) | 38.6 (20.8) | 37.9 (1.0) | 120 (3.4) | 684 (15) | 37.2 (3.5) |
| 12 | 75.0 | 39.8 (29.9) | 3.6 (2.7) | 28.4 (21.3) | 28.2 (21.2) | 40.6 (1.8) | 104 (1.7) | 733 (28) | 34.6 (3.0) |
| 24 | 89.7 | 41.6 (37.3) | 3.6 (3.2) | 30.9 (27.7) | 23.9 (21.4) | 42.4 (1.6) | 95 (2.8)  | 784 (16) | 33.5 (2.7) |
| 48 | 95.2 | 40.5 (38.6) | 3.3 (3.1) | 33.5 (31.9) | 22.7 (21.6) | 47.0 (1.3) | 82 (6.3)  | 822 (34) | 32.0 (1.5) |

Wt. Ratio of AN/St = 75/25, wt ratio of (AN + St)/BMA = −1/1, VTPCL = 5 wt % in monomer system
Time of partial polymerization of the monomer before the preparation of the concentrated emulsion: 1 h.
Time of partial polymerization of concentrated emulsions before mixing 30 min.

TABLE 11

| Time of polymn. after the concentrated emulsions were mixed (h) | Conversion (wt %) | Solubilities: wt % in product and (wt % of the initial reactants) | | | Network Content | Mechanical properties and (Std. Err.) | | | |
|---|---|---|---|---|---|---|---|---|---|
| | | toluene removed | THF removed | DMF removed | | Yield strength (MPa) | Elongation at break (%) | Young Modulus (MPa) | Toughness MJ/m$^3$ |
| 0 | 32.0 | 39.1 (12.5) | 0 | 23.1 (7.4) | 37.8 (12.1) | 14.8 (0.6) | 82 (3.7) | 304 (10) | 9.6 (0.8) |
| 3 | 52.5 | 35.2 (18.4) | 0.9 (0.5) | 20.0 (10.5) | 43.8 (23.0) | 18.6 (1.9) | 105 (4.5) | 374 (32) | 16.6 (0.9) |
| 6 | 63.8 | 39.8 (25.4) | 1.1 (0.7) | 22.5 (14.4) | 36.5 (23.3) | 20.9 (1.7) | 94 (2.7) | 432 (10) | 16.5 (1.3) |
| 12 | 79.9 | 39.9 (30.0) | 1.4 (1.1) | 26.9 (20.1) | 31.8 (23.8) | 26.5 (1.2) | 81 (1.3) | 484 (16) | 17.4 (1.6) |
| 24 | 95.3 | 39.6 (37.7) | 1.7 (1.6) | 33.4 (31.8) | 25.3 (24.1) | 28.8 (1.5) | 68 (2.0) | S15 (5) | 16.2 (1.3) |
| 48 | 98.9 | 39.4 (38.0) | 1.8 (1.8) | 35.1 (34.7) | 24.6 (24.3) | 30.9 (1.2) | 58 (2.5) | 594 (4) | 15.2 (0.7) |

Wt. Ratio of AN/St = 50/50, wt ratio of (AN + St)/BMA = –1/1, VTPCL = 5 wt % in monomer system
Time of partial polymerization of the monomer before the preparation of the concentrated emulsion: 1 h.
Time of partial polymerization of concentrated emulsions before mixing 2 h.

TABLE 12

| Time of polymn. after the concentrated emulsions were mixed (h) | Conversion (wt %) | Solubilities: wt % in product and (wt % of the initial reactants) | | | Network Content | Mechanical properties and (Std. Err.) | | | |
|---|---|---|---|---|---|---|---|---|---|
| | | toluene removed | THF removed | DMF removed | | Yield strength (MPa) | Elongation at break (%) | Young Modulus (MPa) | Toughness MJ/m$^3$ |
| 0 | 15.8 | 52.4 (8.3) | 0 | 36.8 (5.8) | 10.8 (1.7) | 4.8 (0.6) | 57 (0.7) | 150 (2) | 2.2 (0.2) |
| 3 | 37.8 | 25.2 (9.5) | 2.1 (0.8) | 17.7 (6.7) | 36.0 (13.6) | 28.9 (1.2) | 74 (7.0) | 448 (6) | 17.3 (0.8) |
| 6 | 67.9 | 37.2 (25.3) | 5.2 (3.5) | 29.3 (19.9) | 28.3 (19.2) | 30.8 (0.7) | 161 (5.2) | 531 (11) | 42.1 (3.6) |
| 12 | 84.4 | 39.6 (33.4) | 5.4 (4.6) | 31.4 (26.5) | 23.6 (19.9) | 32.8 (1.1) | 153 (7.0) | 619 (27) | 41.4 (3.7) |
| 24 | 90.3 | 39.6 (35.8) | 5.8 (5.2) | 32.3 (29.2) | 22.3 (20.1) | 37.2 (2.5) | 144 (6.3) | 637 (59) | 42.8 (2.6) |
| 48 | 100 | 36.3 (36.3) | 5.9 (5.9) | 37.4 (37.4) | 20.4 (20.4) | 38.9 (1.2) | 132 (13) | 642 (4i) | 40.6 (1.5) |

Wt. Ratio of AN/St = 50/50, wt ratio of (AN + St)/BMA = –1/1, VTPCL = 5 wt % in monomer system
Time of partial polymerization of the monomer before the preparation of the concentrated emulsion: 1 h.
Time of partial polymerization of concentrated emulsions before mixing 30 min.

TABLE 13

| time of polymn. After the concentrated were mixed (h) | Conversion (wt %) | Solubilities: wt % in product and (wt % of the initial reactants) | | | Mechanical properties and (Std. Err.) | | | |
|---|---|---|---|---|---|---|---|---|
| | | toluene removed | THF removed | DMF removed | Yield strength (MPa) | Elongation at break (%) | Young Modulus (MPa) | Toughness MJ/m$^3$ |
| 0 | 8.6 | 64.0 (5.5) | 0 | 36.0 (3.1) | 22.6 (1.3) | 26 (1.2) | 215 (9) | 4.7 (0.3) |
| 3 | 57.7 | 59.0 (34.0) | 8.0 (4.6) | 33.0 (19.0) | 33.8 (2.3) | 39 (1.4) | 675 (53) | 10.7 (1.1) |
| 6 | 88.5 | 56.0 (49.6) | 7.5 (6.6) | 36.5 (32.3) | 45.8 (1.9) | 62 (2.9) | 778 (15) | 23.6 (1.8) |
| 12 | 91.3 | 54.8 (50.0) | 7.6 (6.9) | 37.5 (34.2) | 47.4 (0.7) | 45 (1.7) | 823 (42) | 17.3 (1.3) |
| 24 | 93.6 | 53.7 (50.3) | 8.7 (8.1) | 37.6 (35.2) | 52.5 (2.1) | 35 (2.1) | 899 (38) | 14.7 (1.2) |
| 48 | 96.3 | 52.8 (50.8) | 9.0 (8.7) | 38.2 (36.8) | 53.1 (1.7) | 24 (1.7) | 912 (21) | 6.1 (0.7) |

Wt. Ratio of AN/St = 50/50, wt ratio of (AN + St)/BMA = –1/1, no VTM introduced.
Time of partial polymerization of the monomer before the preparation of the concentrated emulsion: 1 h.
Time of partial polymerization of concentrated emulsions before mixing 30 min.

The concentrated emulsion polymerization leading to a blend constitutes a very complicated process since several reactions take place simultaneously. Before the two concentrated emulsions are mixed, the homopolymerization between VTM and the monomers take place. After the concentrated emulsions are mixed, ternary copolymerization and a large variety of networks are, in addition, generated. Hence four kinds of polymers, PBMA, binary copolymer AN-St, ternary copolymer AN-St-BMA, and networks, are present in a concentrated emulsion blend. It is difficult to determine its exact composition. On the basis of the solubility measurement described in Example 6, the species in such a blend can be divided in four groups: PBMA and copolymers with an AN content below 10 wt % which are completely soluble in all three solvents; copolymers with AN content between 10 and 33 wt % which are completely soluble in THF and DMF; copolymers with an AN content above 33 wt % which are completely soluble in DMF, and network species. In a first approximation, the four groups of species identified by the solubility measurements are said to roughly represent the four types of polymers present in the system.

The solubility data in Tables 8–13 show that, in the final products, the content of the crosslinked structure was between 20–25 wt %, the content of the ternary copolymer was below 6 wt %, and the content of BMA homopolymer and binary copolymer AN-St was higher than 70 wt %. It is believed that the rates of formation of various components are different. The network structure is mostly formed before conversion is 50 wt %; once conversion exceeds 50 wt %, the increase in network content is negligible. This indicates that, in spite of its longer length, the VTM possesses a higher reactivity than the smaller monomers. It also indicates that the polymers formed after 50 wt % conversion are mostly linear ones. This may explain why the network acts as a compatibilizers. Once a linear polymer chain is formed, it will tend to locate near a network chain of similar chemical structure. Consequently, the various parts of the network are in contact with different linear chains and compatibilization is achieved.

The samples on the first rows of Tables 2, 3, 4 and 6, for which the conversion is low, possessed very poor mechanical properties. Since those samples were obtained immediately after the two concentrated emulsions were mixed, most of the VTM had not yet reacted, and network content was very low. Consequently, the mechanical properties are poor. The yield strength and the Young modulus increased as the conversion increased. This can be related to the content of AN-St, which has a high yield strength and a high Young modulus. The AN-St content (represented by the wt % of DMF removed species in Tables 9–12) exhibited a minimum, after which it increases as the conversion increases. This indicates that the monomers AN and styrene were mainly consumed in the formation of networks in the early stages of polymerization. After network formation was nearly completed, the monomers AN and styrene formed mainly linear AN-St copolymer. However, both the network chains and the linear chains of AN-St provided a similar contribution to the yield strength and Young modulus: the higher the content of AN-St chains, the higher the yield strength and the Young modulus. The elongation at break and the toughness exhibited a maximum around a conversion of 40–60 wt %, which can be related to the relative proportion of flexible chains (i.e., PBMA and VTM chains). As mentioned before, the VTM molecules are mostly included in the network before a conversion of 50 wt % is achieved. In addition, Tables 8–13 show that the toluene removed species increases little after a conversion of about 90 wt %. This indicates that BMA was nearly consumed at that conversion. Consequently, the chains formed after a conversion of 90 wt % are believed to have been mainly those of the AN-St copolymer. The different rates of formation of different species resulted in a maximum content of flexible chains at a conversion of 40–60 wt %. As a result, maxima of the elongation at break and the toughness were observed.

Example 16

Effect of VTM Content on the AN/S+BMA Composites.

VTM is the key precursor of the network compatibilizer. Without VTM, the products consist of a mixture of a homopolymer and binary and ternary copolymers, with poor compatibility. The toughness and elongation at break of products made without VTM were very low, as can be seen by comparing Table 9 with Table 13 and Table 14 with Table 15. The toughness of the samples containing 5 wt % VTM was 3–5 times higher than that of those free of VTM. However, because of the presence of the soft chains of VTM, the yield strength and the Young modulus were somewhat lower than of those without VTM. The effect of VTM content can be seen from Table 16, in which the VTPCL content changes from 0 to 10 wt %. There is also an abrupt increase in the elongation at break and toughness from the sample containing 2.5 wt % to that containing 5 wt % VTPCL. When the VTPCL content increases from 5 wt % to 10 wt %, the toughness increases only a little but the yield strength and the Young modulus decrease, possibly because greater amounts of soft chains are introduced. It appears that a VTPCL content of 5 wt % provides the optimum benefit.

TABLE 14

| | Solubilities | | | Mechanical properties and (Std. Err.) | | | |
|---|---|---|---|---|---|---|---|
| AN/St wt ratio | toluene removed wt % | THF removed wt % | DMF removed wt % | Yield strength (MPa) | Elongation at break (%) | Young Modulus (MPa) | Toughness MJ/m$^3$ |
| 0/100 | 100 | 0 | 0 | 50.9 (1.2) | 17 (1.0) | 889 (25) | 7.1 (0.2) |
| 25/75 | 54.6 | 45.4 | 0 | 51.0 (4.0) | 17 (1.6) | 904 (15) | 7.1 (0.6) |
| 50/50 | 52.5 | 9.0 | 38.5 | 53.1 (1.7) | 24 (1.7) | 912 (21) | 10.6 (0.7) |
| 66/33 | 44.3 | 5.5 | 50.2 | 53.5 (1.4) | 33 (1.3) | 914 (45) | 15.1 (0.8) |
| 75/25 | 40.8 | 4.3 | 54.9 | 54.2 (0.7) | 19 (1.5) | 927 (60) | 8.7 (0.8) |

Wt. Ratio of (AN/St)/BMA = −1/1, no VTM introduced.

Time of partial polymerization of the monomer before the preparation of the concentrated emulsion: 1 h.

Time of partial polymerization of concentrated emulsions before mixing 30 min.

Time of the mixture of the concentrated emulsions: 48 h.

TABLE 15

| AN/St wt ratio | Solubilities | | | | Mechanical properties and (Std. Err.) | | | |
|---|---|---|---|---|---|---|---|---|
| | toluene removed wt % | THF removed wt % | DMF removed wt % | Network Content wt % | Yield strength (MPa) | Elongation at break (%) | Young Modulus (MPa) | Toughness MJ/m$^3$ |
| 0/100 | 80.6 | 0 | 0 | 19.4 | 37.4 (1.3) | 58 (3.0) | 715 (35) | 18.2 (0.4) |
| 25/75 | 40.9 | 37.9 | 0 | 21.1 | 39.5 (1.9) | 75 (4.2) | 724 (32) | 25.9 (0.8) |
| 33/66 | 41.7 | 31.3 | 5.6 | 21.4 | 40.3 (0.5) | 96 (3.7) | 736 (8) | 31.7 (1.5) |
| 50/50 | 39.2 | 5.5 | 31.8 | 24.2 | 42.0 (1.3) | 115 (9.1) | 766 (35) | 37.5 (0.8) |
| 66/33 | 41.2 | 3.8 | 30.9 | 24.1 | 44.1 (1.7) | 119 (8.8) | 791 (33) | 43.5 (2.7) |
| 75/25 | 40.5 | 3.3 | 33.5 | 22.7 | 47.0 (1.3) | 82 (6.3) | 822 (34) | 32.0 (1.5) |

Wt. Ratio of (AN + St)/BMA = 1/1, VTPCL = 5 wt %
Time of partial polymerization of the monomer before the preparation of the concentrated emulsion: 1 h.
Time of partial polymerization of concentrated emulsions before mixing 30 min.
Time of the mixture of the concentrated emulsions: 48 h.

TABLE 16

| Fraction of VTPCL (wt %) | Solubilities | | | | Mechanical properties and (Std. Err.) | | | |
|---|---|---|---|---|---|---|---|---|
| | toluene removed wt % | THF removed wt % | DMF removed wt % | Network Content wt % | Yield strength (MPa) | Elongation at break (%) | Young Modulus (MPa) | Toughness MJ/m$^3$ |
| 0 | 52.5 | 9.0 | 38.5 | 0 | 53.1 (1.7) | 14 (1.7) | 912 (21) | 7.1 (0.7 |
| 2.5 | 49.2 | 6.2 | 33.7 | 11.2 | 50.3 (2.5) | 25 (2.5) | 875 (63) | 10.5 (1.5) |
| 5.0 | 39.2 | 5.5 | 31.8 | 24.2 | 42.0 (1.3) | 115 (9.1) | 766 (35) | 37.5 (0.8) |
| 10.0 | 29.5 | 4.2 | 24.8 | 41.5 | 35.7 (1.7) | 159 (13) | 678 (11) | 40.5 (2.1) |

Wt ratio of AN/St = 50/50, wt ratio of (AN + St)/BMA = 1/1.
Time of partial polymerization of the monomer before the preparation of the concentrated emulsion: 1 h.
Time of partial polymerization of concentrated emulsions before mixing 30 min.
Time of the mixture of the concentrated emulsions: 48 h.

Example 17
Effect of VTM Addition Procedure on the AN/St/BMA Composites.

Not only the amount of VTPCL introduced, but also the moment of its addition affected the compatibilization. The results of the various addition procedures of VTPCL are presented in Table 17. Five procedures were employed: (1) VTPCL was partially polymerized with the monomer(s) from the beginning; (2) VTPCL was introduced after the partial polymerization of the monomer(s), before the preparation of the concentrated emulsion; (3) VTPCL was introduced into the mixed concentrated emulsions; (4) a third concentrated emulsion of VTPCL solution in water was prepared and mixed with the other two concentrated emulsions; and (5) the procedure described in (2) was employed, but the partial polymerization of each concentrated emulsion lasted 2 h before they were mixed. Table 17 shows that procedures 1 and 5 provided lower mechanical properties. The reason is believed to be that the VTPCL reacted for too long with the monomers of only one concentrated emulsion. As a result, the compatibilizing effect was poor. Comparable mechanical properties were obtained with procedures 2–4. This indicates that optimal compatibilization can be achieved when the VTM has enough time to react with the monomers of both concentrated emulsions.

TABLE 17

| No. of VTPCL addition procedure | Solubilities | | | | Mechanical properties and (Std. Err.) | | | |
|---|---|---|---|---|---|---|---|---|
| | toluene removed wt % | THF removed wt % | DMF removed wt % | Network Content wt % | Yield strength (MPa) | Elongation at break (%) | Young Modulus (MPa) | Toughness MJ/m$^3$ |
| 1 | 35.2 | 3.9 | 31.3 | 29.6 | 35.0 (0.8) | 39 (3.6) | 622 (10) | 11.4 (1.2) |
| 2 | 39.2 | 5.5 | 31.8 | 24.2 | 42.0 (1.3) | 115 (9.1) | 766 (35) | 37.5 (0.8) |
| 3 | 37.5 | 5.7 | 30.4 | 26.4 | 39.5 (0.7) | 112 (3.3) | 747 (29) | 36.7 (1.4) |
| 4 | 36.2 | 4.9 | 33.1 | 25.8 | 43.3 (1.7) | 124 (6.3) | 778 (17) | 45.6 (2.2) |
| 5 | 39.4 | 1.8 | 35.1 | 24.6 | 30.9 (1.2) | 58 (2.5) | 594 (4) | 15.2 (0.7) |

Wt ratio of AN/st = 50/50, wt ratio of (AN + St)/BMA = 1/1, VTPCL = 5 wt %.
Time of partial polymerization of the monomer before the preparation of the concentrated emulsion: 1 h.
Time of partial polymerization of concentrated emulsions before mixing was 30 min for Rows 1–4, 2 h for Row 5.
Time of the mixture of the concentrated emulsions: 48 h.

Example 18
Comparison of VTPCL and VTPB.

Vinyl terminated polybutadiene ("VTPB") was also employed in the self-compatibilization of AN-St and PBMA. The data based on VTPB and VTPCL are presented in Table 18 as well as in Tables 9 and 12. Since the molecular weight of VTPB employed was higher than that of VTPCL (2,800 vs. 2,000), the number of VTPB molecules was lower for the same weight fraction. For this reason, the network content of the VTPB based samples was also lower. In addition, because PB chains are longer and more flexible than PCL chains, the VTPB based samples possessed higher elongation at break and toughness and lower yield strength and Young modulus.

TABLE 18

| | | Mechanical properties and (Std. Err.) | | | |
|---|---|---|---|---|---|
| AN/st wt ratio | VTM wt % | Yield strength (MPa) | Elongation at break (%) | Young Modulus (MPa) | Toughness MJ/m$^3$ |
| 25/75 | PCL5% | 39.5 (1.9) | 75 (4.2) | 724 (32) | 25.9 (0.8) |
| 25/75 | PB5% | 36.7 (2.5) | 104 (5.2) | 626 (30) | 31.5 (2.8) |
| 50/50 | PCL5% | 42.0 (1.3) | 115 (9.1) | 766 (35) | 37.5 (0.8) |
| 50/50 | PB5% | 38.9 (1.2) | 132 (13) | 642 (41) | 40.6 (1.5) |
| 75/25 | PCL5% | 47.01 (1.3) | 82 (6.3) | 822 (34) | 32.0 (1.5) |
| 75/25 | PB5% | 40.3 (1.9) | 111 (3.5) | 704 (29) | 37.7 (2.2) |
| 50/50 | PCL10% | 35.7 (1.7) | 159 (13) | 678 (11) | 40.5 (2.1) |
| 50/50 | PB10% | 35.8 (1.7) | 168 (9) | 603 (27) | 50.6 (3.7) |

Wt ratio of (AN + St)/BMA = 1/1.
Time of partial polymerization of the monomer before the preparation of the concentrated emulsion: 1 h.
Time of partial polymerization of concentrated emulsions before mixing: 30 min.
Time of the mixture of the concentrated emulsions: 48 h.

instead of a blend. To avoid the undesired copolymerization, the monomer transfer can be controlled by increasing the viscosity of the concentrated emulsions before they are mixed by partial polymerization. The effect of the monomer conversion in the partial polymerization is presented in Table 19. Table 19 shows that, when the conversions were lower than 9.9 wt % for BMA and 7.2 wt % for the mixture of AN and St, respectively, the final product had a high THF removed wt %, which indicates a high content of ternary copolymers. This may explain the low toughness observed for these conversions. As the conversions (viscosities as well) of the concentrated emulsions which were mixed increased, the content of ternary copolymer decreased (indicated by the THF removed wt %), and the toughnesses were much improved. On the other hand, it appears that the partial polymerization of each concentrated emulsion should not be too advanced. The 5th row of Table 19 shows that, when each of the concentrated emulsions reached a very high conversion before their mixing, low toughness was obtained. This is believed to be because almost all the VTM reacts with the monomers of only one of the concentrated emulsions, which results in poor compatibilization. A comparison between Tables 6 and 11 leads to the same conclusion. The highest conversions for which the two concentrated emulsions can be easily mixed uniformly are presented in the 5th row of Table 19. Beyond those conversions the concentrated emulsions acquire a high viscosity which makes uniform mixing difficult.

TABLE 19

| Time of polymn. before the concentrated emulsions were mixed (h) | Conversion* (wt %) | | Solubilities | | | | Mechanical properties and (Std. Err.) | | | |
|---|---|---|---|---|---|---|---|---|---|---|
| | BMA | AN/St | toluene removed wt % | THF removed wt % | DMF removed wt % | Network Content wt % | Yield strength (MPa) | Elongation at break (%) | Young Modulus (MPa) | Toughness MJ/m$^3$ |
| 0 | 7.1 | 4.9 | 32.1 | 17.8 | 25.2 | 24.9 | 28.9 (1.0) | 39 (3.6) | 607 (32) | 9.7 (0.7) |
| 0.5 | 9.9 | 7.2 | 39.2 | 5.5 | 31.8 | 24.2 | 42.0 (1.3) | 115 (9.1) | 766 (35) | 37.5 (0.8) |
| 1.0 | 14.8 | 9.9 | 37.6 | 4.6 | 30.7 | 27.1 | 41.5 (2.7) | 123 (6.0) | 767 (28) | 40.8 (4.2) |
| 1.5 | 26.8 | 16.6 | 38.1 | 4.0 | 33.9 | 24.0 | 38.9 (1.0) | 93 (1.5) | 689 (6) | 30.5 (1.5) |
| 2.0 | 36.0 | 22.0 | 39.4 | 1.8 | 35.1 | 24.6 | 30.9 (1.2) | 58 (2.5) | 594 (4) | 15.2 (0.7) |

Wt. Ratio of AN/St = 50/50, wt ratio of (AN + St)/BMA = 1/1, VTPCL = 5 wt %.
Time of partial polymerization of the monomer before the preparation of the concentrated emulsion: 1 h.
Time of the mixture of the concentrated emulsions: 48 h.
*Partial conversion in each concentrated emulsions before they were mixed.

Example 19
Effect of Concentrated Emulsion Viscosity.

When two concentrated emulsions are mixed with stirring, the transfer of monomers among the cells cannot be avoided. However, only a suitable transfer of the monomers is effective for self-compatibilization. If the monomer transfer is too advanced, the product will be a ternary copolymer

Example 20
Effect of the AN/St Ratio in the AN/St/BMA Composites.

The AN/St weight ratio in the concentrated emulsions containing AN and St was varied between 0/100 and 75/25. Since AN is very polar it cannot be used alone to prepare a concentrated emulsion in water. It can be, however, used together with a more hydrophobic monomer such as styrene. The effect of the AN/St weight ratio on the final self-compatibilized blend with PBMA is presented in Tables 14, 15, and 20. The higher the AN content, the higher the yield strength and the Young modulus, presumably because of the strong attraction between the polar CN groups. It is also interesting to note that both the elongation at break and the toughness exhibited maxima. It is believed that the main obstacle to elongation is caused by the phenyl groups. The higher the AN/St weight ratio, the lower the phenyl group density and, hence, the longer the elongation at break. However, if the AN/St weight ratio becomes too high, intermolecular forces between the polar CN groups become dominant, and elongation at break decreases. The presence of AN among the styrene units increases the flexibility as long as the content of AN is not too large. When the content of AN is high, the interaction forces between the polar CN groups decrease the flexibility. For this reason, the toughness passes through a maximum. Tables 14, 15, and 20 indicate that the optimum AN/St weight ratio is between 50/50 and 66/33.

As already mentioned, the solubility parameters of PAN, PS, and PBMA are 31.5, 17.8, and 14.7 $(MPa)^{1/2}$, respectively. Assuming a linear additivity for the solubility parameter of a random copolymer, the solubility of the copolymer with a weight ratio AN/St=75/25 is 28.0, which is much larger than that of PBMA. In spite of the large differences in solubility parameters, all AN-St copolymers and PS were toughened by PBMA when the self-compatibilization method was employed (see Tables 14, 15, and 20). This indicates that the method of self-compatibilization can be used for a wide range of differences in the solubility parameters of the polymers involved.

TABLE 20

| AN/St wt ratio | Solubilities | | | | Mechanical properties and (Std. Err.) | | | |
|---|---|---|---|---|---|---|---|---|
| | toluene removed wt % | THF removed wt % | DMF removed wt % | Network Content wt % | Yield strength (MPa) | Elongation at break (%) | Young Modulus (MPa) | Toughness MJ/m³ |
| 0/100 | 75.4 | 0 | 0 | 24.6 | 46.8 (1.4) | 26 (0.5) | 827 (34) | 9.7 (0.4) |
| 25/75 | 19.1 | 56.6 | 0 | 24.3 | 47.2 (1.2) | 30 (1.7) | 8S8 (56) | 12.0 (1.1) |
| 50/50 | 17.8 | 9.0 | 43.7 | 29.4 | 49.9 (1.9) | 61 (4.4) | 907 (23) | 25.7 (2.4) |
| 75/25 | 18.9 | 5.2 | 49.7 | 26.2 | 55.4 (0.6) | 22 (0.6) | 948 (6S) | 9.5 (0.2) |

Wt ratio of (AN + St)/BMA = 2/1, VTPCL = 5 wt %.
Time of partial polymerization of the monomer before the preparation of the concentrated emulsion: 1 h.
Time of partial polymerization of concentrated emulsions before mixing: 30 min.
Time of the mixture of the concentrated emulsions: 48 h.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A method for preparing a polymer composite comprising:

providing a mixture of concentrated emulsions comprising either a divinyl-terminated macromonomer and a first partially polymerized concentrated emulsion of a first monomer or a first partially copolymerized concentrated emulsion of a divinyl-terminated macromonomer and a first monomer and either a second partially polymerized concentrated emulsion of a second monomer or a second partially copolymerized concentrated emulsion of a divinyl-terminated macromonomer and a second monomer and polymerizing the mixture of concentrated emulsions under conditions effective to form a polymer composite.

2. A method according to claim 1, wherein said providing a mixture of concentrated emulsions comprises:

providing a first concentrated emulsion comprising the divinyl-terminated macromonomer and the first partially polymerized concentrated emulsion of the first monomer and mixing the first concentrated emulsion with a second concentrated emulsion comprising either the second partially polymerized concentrated emulsion of the second monomer or the second partially copolymerized concentrated emulsion of the divinyl-terminated macromonomer and the second monomer.

3. A method according to claim 2, wherein said providing a first concentrated emulsion comprises:

providing a mixture of divinyl-terminated macromonomer and first monomer;

emulsifying the mixture under conditions effective to form a concentrated emulsion; and partially polymerizing the concentrated emulsion.

4. A method according to claim 3 wherein said emulsifying is carried out using sodium dodecyl sulfate.

5. A method according to claim 2, wherein said providing a first concentrated emulsion comprises:

providing a concentrated emulsion of a partial polymerization product of the first monomer; and mixing the concentrated emulsion of the partial polymerization product of the first monomer with a divinyl-terminated macromonomer.

6. A method according to claim 5, wherein said providing a concentrated emulsion of the partial polymerization product of the first monomer comprises:

providing a concentrated emulsion of the first monomer and reacting the concentrated emulsion of the first monomer under conditions effective to partially polymerize the first monomer.

7. A method according to claim 5, wherein said providing a concentrated emulsion of the partial polymerization product of the first monomer comprises:

providing a partial polymerization product of the first monomer and emulsifying the partial polymerization product of the first monomer under conditions effective to form a concentrated emulsion.

8. A method according to claim 5, wherein the divinyl-terminated macromonomer is provided in the form of a concentrated emulsion.

9. A method according to claim 1, wherein said providing a mixture of concentrated emulsions comprises:

provide a first concentrated emulsion comprising a first partially copolymerized concentrated emulsion of the divinyl-terminated macromonomer and the first monomer and mixing the first concentrated emulsion with a second concentrated emulsion comprising either a second partially polymerized concentrated emulsion of the second monomer or a second partially copolymerized concentrated emulsion of the divinyl-terminated macromonomer and the second monomer.

10. A method according to claim 9, wherein said providing a first concentrated emulsion comprises:

providing a first partial copolymerization product of the divinyl-terminated macromonomer and the first monomer and emulsifying the first partial copolymerization product of the divinyl-terminated macromonomer and the first monomer under conditions effective to form a concentrated emulsion.

11. A method according to claim 10, wherein said providing a first partial copolymerization product of the divinyl-terminated macromonomer and the first monomer comprises:

providing a mixture of first monomer and divinyl-terminated macromonomer and reacting the mixture of first monomer and divinyl-terminated macromonomer under conditions effective to partially copolymerize the first monomer and the divinyl-terminated macromonomer.

12. A method according to claim 1, wherein said providing a mixture of concentrated emulsions comprises:

providing a concentrated emulsion comprising a first partially polymerized concentrated emulsion of the first monomer and a second partially polymerized concentrated emulsion of the second monomer;

providing the divinyl-terminated macromonomer; and mixing the concentrated emulsion comprising the first partially polymerized concentrated emulsion of the first monomer and the second partially polymerized concentrated emulsion of the second monomer with the divinyl-terminated macromonomer.

13. A method according to claim 12, wherein the divinyl-terminated macromonomer is provided in the form of a concentrated emulsion.

14. A method according to claim 12, wherein said providing a concentrated emulsion comprising the first partially polymerized concentrated emulsion of the first monomer and the second partially polymerized concentrated emulsion of the second monomer comprises:

providing a concentrated emulsion of a first partial polymerization product of the first monomer;

providing a concentrated emulsion of a second partial polymerization product of the second monomer; and mixing the concentrated emulsion of the first partial polymerization product of the first monomer and the concentrated emulsion of the second partial polymerization product of the second monomer under conditions effective to form a mixture of concentrated emulsions comprising the first partially polymerized concentrated emulsion of the first monomer and the second partially polymerized concentrated emulsion of the second monomer.

15. A method according to claim 1, wherein each of the first partially polymerized concentrated emulsion and the second partially polymerized concentrated emulsion, respectively, comprises a first polymer and second polymer independently selected from the group consisting of poly(styrene-co-methyl methacrylate), poly(vinyl acetate), poly(acrylonitrile-co-styrene), and poly(butyl methacrylate).

16. A method according to claim 1, wherein the divinyl-terminated macromonomer is selected from the group consisting of divinyl-terminated polycaprolactone and divinyl-terminated polybutadiene.

17. A method according to claim 1, wherein the first partially polymerized concentrated emulsion comprises poly(styrene-co-methyl methacrylate) and wherein the second partially polymerized concentrated emulsion comprises poly(vinyl acetate).

18. A method according to claim 17, wherein the divinyl-terminated macromonomer is divinyl-terminated polycaprolactone.

19. A method according to claim 1, wherein the first partially polymerized concentrated emulsion comprises poly(acrylonitrile-co-styrene) and wherein the second partially polymerized concentrated emulsion comprises poly(butyl methacrylate).

20. A method according to claim 19, wherein the divinyl-terminated macromonomer is divinyl-terminated polybutadiene.

21. A method according to claim 1, wherein the divinyl-terminated macromonomer has a molecular weight from about 500 to about 5000 g/mole.

22. A method according to claim 1, wherein the polymer composite is a polymer blend.

23. A method according to claim 1, wherein each concentrated emulsion has a dispersed phase volume fraction greater than about 0.74.

* * * * *